US008016151B2

(12) United States Patent
Barrett et al.

(10) Patent No.: US 8,016,151 B2

(45) Date of Patent: Sep. 13, 2011

(54) FLUID CONTROLLED CONTAINMENT BERM SYSTEM

(75) Inventors: Andrew N. Barrett, Spokane, WA (US); Craig G. Dolsby, Spokane, WA (US)

(73) Assignee: Berg Companies Inc., Spokane, WA (US)

( * ) Notice: Subject to any disclaimer, the term of this patent is extended or adjusted under 35 U.S.C. 154(b) by 1110 days.

(21) Appl. No.: 11/379,159

(22) Filed: Apr. 18, 2006

(65) Prior Publication Data

US 2010/0294779 A1 Nov. 25, 2010

(51) Int. Cl.

*B65D 1/34* (2006.01)
*A45C 7/00* (2006.01)
*B01D 21/00* (2006.01)

(52) U.S. Cl. .......................... 220/573; 220/9.2; 210/803

(58) Field of Classification Search .................. 220/573, 220/9.2, 4.16, 571, 904, 666, 9.4; 114/345; 210/803

See application file for complete search history.

(56) References Cited

U.S. PATENT DOCUMENTS 3,284,273 A * 11/1966 Prentice .......................... 428/76
3,612,329 A 10/1971 Parks et al.
4,890,628 A * 1/1990 Jackson ........................ 128/849
5,090,588 A * 2/1992 Van Romer et al. .......... 220/573
5,102,261 A * 4/1992 Gunderson, III ............... 405/70
5,316,175 A 5/1994 Van Romer
5,429,437 A 7/1995 Shaw et al.
5,762,233 A 6/1998 Van Romer
5,797,994 A 8/1998 Rasmussen
5,924,461 A 7/1999 Shaw et al.
6,019,243 A * 2/2000 Marino ......................... 220/573
6,092,686 A 7/2000 Shaw et al.
6,230,451 B1 5/2001 Stoller
6,485,229 B1 * 11/2002 Gunderson et al. ............. 405/63
6,648,008 B1 * 11/2003 Price ............................. 137/312
6,880,720 B2 * 4/2005 Van Romer ................... 220/573
6,880,721 B1 * 4/2005 Barrett et al. ................. 220/573
6,938,639 B1 * 9/2005 Robinson ...................... 137/312
7,168,588 B2 * 1/2007 Van Romer ................... 220/571
2003/0029873 A1 2/2003 Moffat et al.
2004/0169041 A1 9/2004 Van Romer
2005/0051547 A1 3/2005 Van Romer
2006/0219721 A1 10/2006 Van Romer
2009/0175684 A1 7/2009 Barrett et al.

FOREIGN PATENT DOCUMENTS

FR 2795162 6/1999

OTHER PUBLICATIONS

Flexible Containment Products, Inc., Containment Berms, www.flexiblecontainment.com, website printout, publication date unknown, 1 page.
U.S. Appl. No. 11/971,167, filed Nov. 5, 2009, Office Action.
U.S. Appl. No. 11/971,167, filed Mar. 29, 2010, Final Office Action.

* cited by examiner

*Primary Examiner* — Anthony Stashick
*Assistant Examiner* — Shawn Braden
(74) *Attorney, Agent, or Firm* — Workman Nydegger

(57) ABSTRACT

A fluid controlled containment berm system for automatically forming a containment berm to contain hazardous liquid spills involving a vehicle. The fluid controlled containment berm system includes a liner including a floor and a sidewall, a buoyant member attached to an upper portion of the liner, and a pair of diffuser members attached between the floor and the sidewall.

30 Claims, 10 Drawing Sheets

FLUID CONTROLLED CONTAINMENT BERM SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to hazardous spill containment berms and more specifically it relates to a fluid controlled containment berm system for automatically forming a containment berm to contain hazardous liquid spills involving a vehicle.

2. Description of the Related Art

Any discussion of the prior art throughout the specification should in no way be considered as an admission that such prior art is widely known or forms part of common general knowledge in the field.

Conventional hazardous material containment berms are typically comprised of a solid concrete pit that the vehicle drives into for loading/unloading of hazardous materials such as chemicals, fuel and the like. Recently, portable hazardous material containment berms have been created that can be transported and setup in remote locations as desired. Conventional portable containment berms are comprised of a fabric attached to a supporting structure. These berms receive vehicles of various weights, sizes and lengths.

A main problem with conventional portable containment berms is that they require significant amounts of time and workers to assemble. A further problem with conventional portable containment berms is that they are relatively large in size and do not allow for a compact storage size. Another of the problems with conventional portable containment berms is that the corners of the fabric material are susceptible to tearing when driven over by the vehicle.

While conventional containment berms may be suitable for the particular purpose to which they address, they are not as suitable for automatically forming a containment berm to contain hazardous liquid spills involving a vehicle. Conventional containment berms typically require extensive setup time to create the supporting walls.

In these respects, the fluid controlled containment berm system according to the present invention substantially departs from the conventional concepts and designs of the prior art, and in so doing provides an apparatus primarily developed for the purpose of automatically forming a containment berm to contain hazardous liquid spills involving a vehicle.

BRIEF SUMMARY OF THE INVENTION

In view of the foregoing disadvantages inherent in the known types of spill containment berms now present in the prior art, the present invention provides a new fluid controlled containment berm system construction wherein the same can be utilized for automatically forming a containment berm to contain hazardous liquid spills involving a vehicle.

The general purpose of the present invention, which will be described subsequently in greater detail, is to provide a new fluid controlled containment berm system that has many of the advantages of the hazardous spill containment berms mentioned heretofore and many novel features that result in a new fluid controlled containment berm system which is not anticipated, rendered obvious, suggested, or even implied by any of the prior art hazardous spill containment berms, either alone or in any combination thereof.

To attain this, the present invention generally comprises a liner including a floor and a sidewall, a buoyant member attached to an upper portion of the liner, and a pair of diffuser members attached between the floor and the sidewall.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a fluid controlled containment berm system that will overcome the shortcomings of the prior art devices.

A second object is to provide a fluid controlled containment berm system for automatically forming a containment berm to contain hazardous liquid spills involving a vehicle.

Another object is to provide a fluid controlled containment berm system that requires little assembly time.

An additional object is to provide a fluid controlled containment berm system that may be folded into a compact structure.

A further object is to provide a fluid controlled containment berm system that is capable of containing various amounts and types of hazardous materials.

Another object is to provide a fluid controlled containment berm system that is relatively inexpensive to manufacture compared to conventional containment berms.

Another object is to provide a fluid controlled containment berm system that is easy to drive onto and out of with a vehicle.

Another object is to provide a fluid controlled containment berm system that can be easily transported, assembled, disassembled and stored.

Another object is to provide a fluid controlled containment berm system that can be utilized with vehicles of various sizes, widths, lengths and weights.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
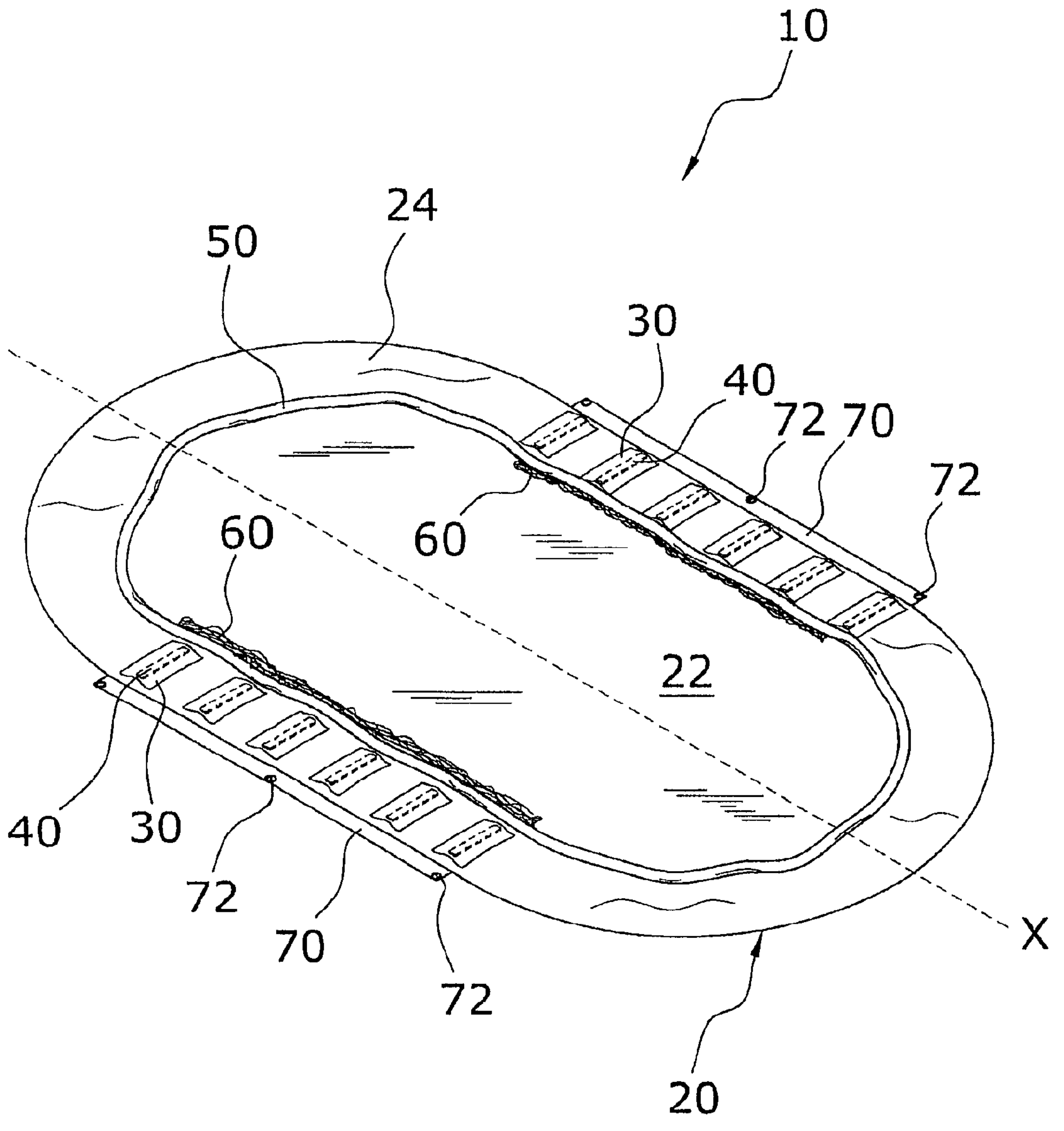
FIG. 1 is an upper perspective view of the present invention in a substantially flat state.

Turning now descriptively to the drawings, in which similar reference characters denote similar elements throughout the several views, FIGS. 1 through 6*b* illustrate a fluid controlled contaimnent berm system 10, which comprises a liner 20 including a floor 22 and a sidewall 24, a buoyant member 50 attached to an upper portion of the liner 20, and a pair of diffuser members 60 attached between the floor 22 and the sidewall 24.

B. Liner

Figure 2:
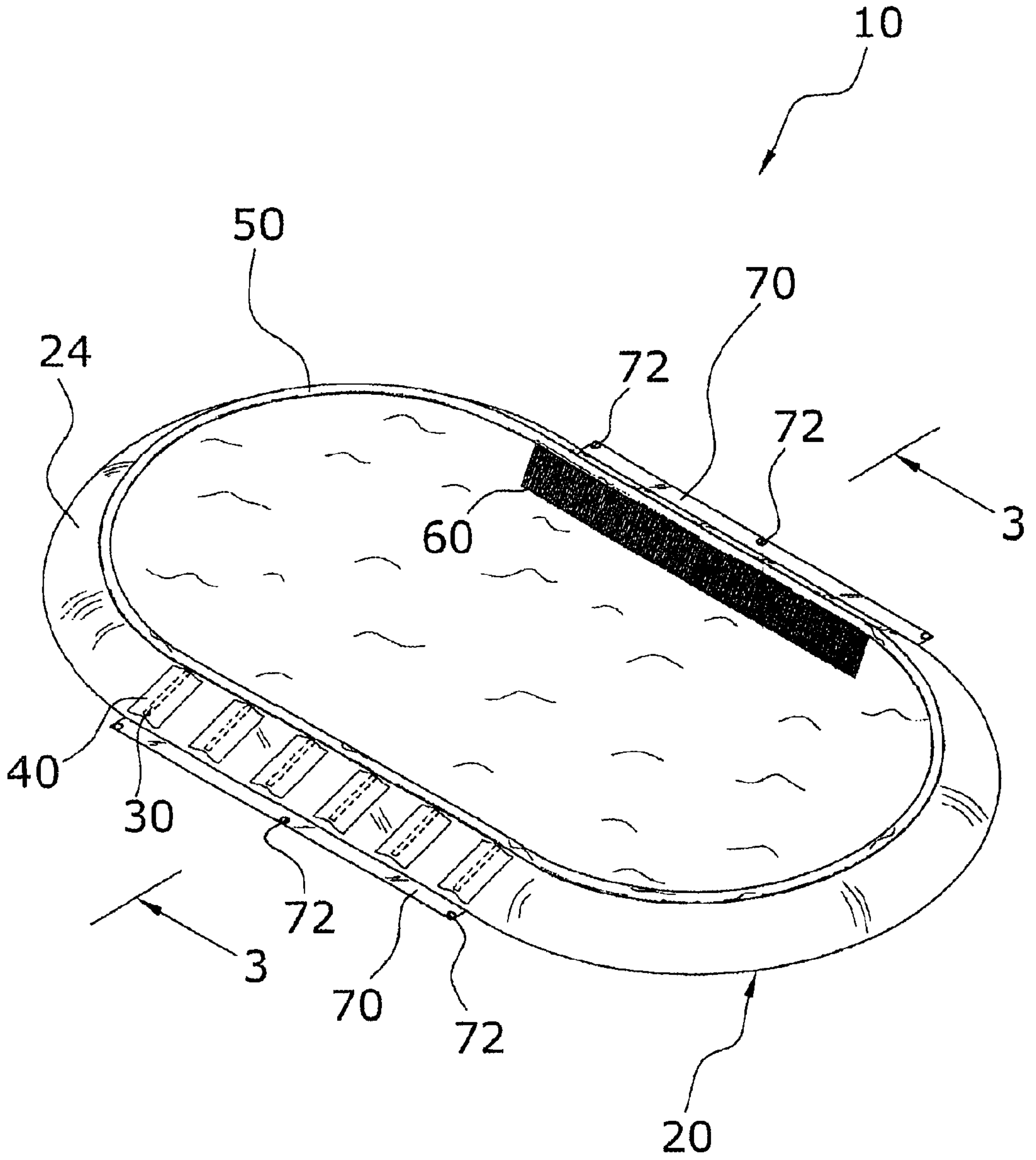
FIG. 2 is an upper perspective view of the present invention in a substantially elevated state.

The liner 20 has a floor 22 and at least one sidewall 24 as best illustrated in FIGS. 1 and 2 of the drawings. The liner 20 includes an inner surface and an outer surface, wherein the inner surface is adjacent to the liquid when being filled.

Figure 6A:
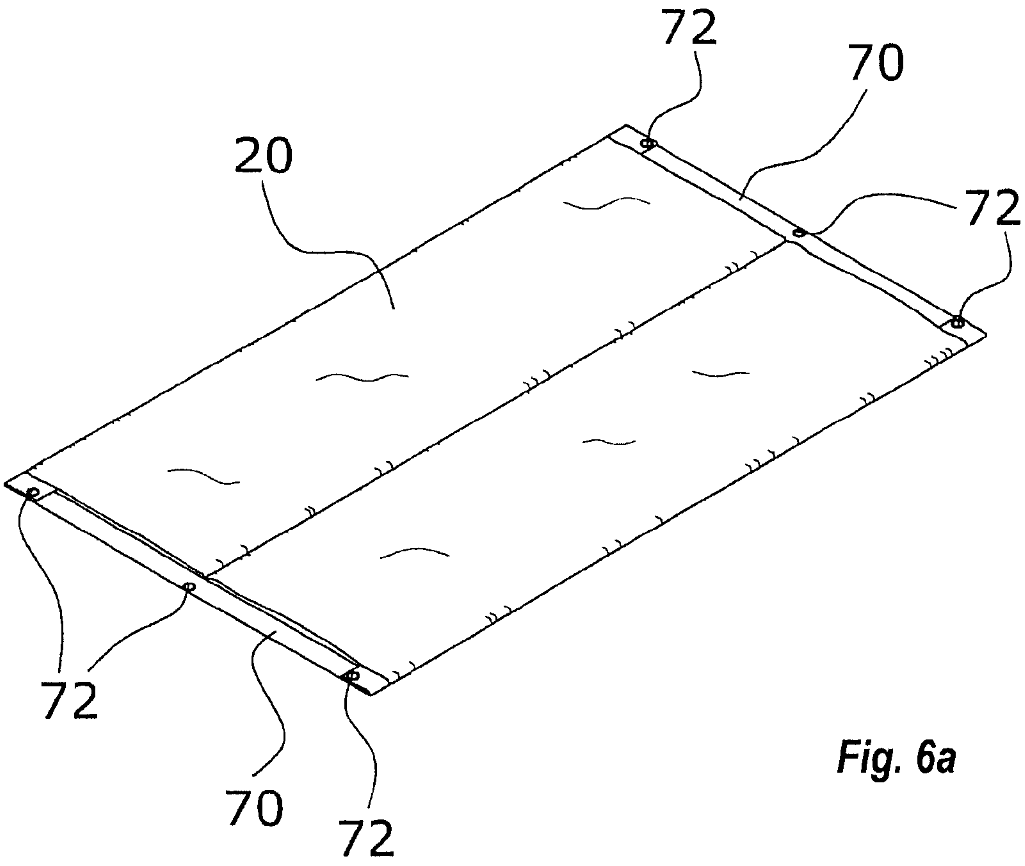
FIG. 6*a* is an upper perspective view of the present invention in a partially folded position.
Figure 6B:
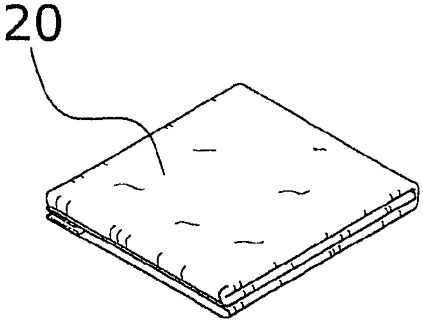
FIG. 6*b* is an upper perspective view of the present invention in a fully folded position.

The liner 20 is preferably comprised of a flexible material to allow the present invention to be folded into a compact storage position as shown in FIGS. 6*a* and 6*b* of the drawings. The liner 20 may be comprised of various materials that are commonly utilized within the hazardous material containment industry that are non-permeably resistant to various chemicals and elements. The liner 20 preferably has an elongate shape with rounded end portions as illustrated FIGS. 1 and 2 of the drawings, however various other shapes may be utilized with the present invention. The liner 20 has a size sufficient for receiving various sizes of vehicles 12 and retaining various volumes of hazardous materials.

As best illustrated in 3 of the drawings, the sidewall 24 preferably has an angled or a curved structure that extends inwardly to contain the liquid within. When the sidewall 24 is angled (or curved) inwardly, the buoyant member 50 is elevated by the liquid entering the liner 20 and the liner 20 is prevented from over expanding which could result in spillage.

A pair of side members 70 preferably are attached to opposing portions of the liner 20 that is substantially parallel to the imaginary line X as shown in FIG. 1 of the drawings. The side members 70 preferably include a plurality of grommets 72 that receive a corresponding plurality of spikes 14 to secure the present invention to a surface.

Figure 4:
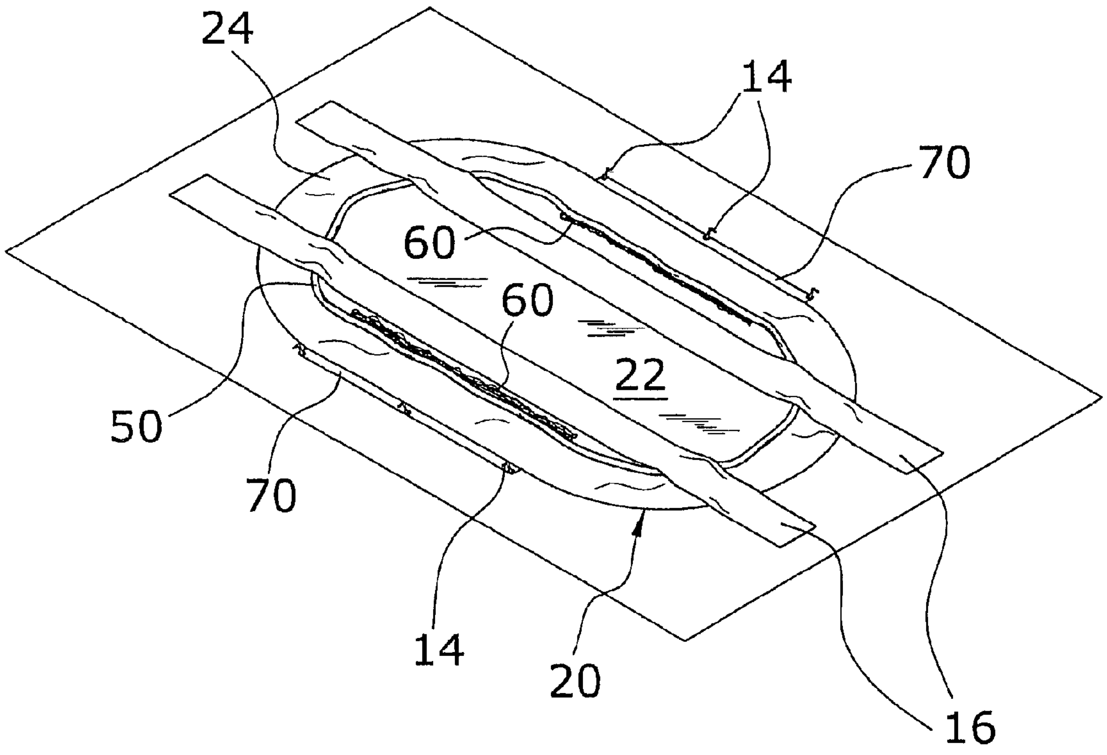
FIG. 4 is an upper perspective view of the present invention in the substantially flat state and secured to a surface.

As shown in FIG. 4 of the drawings, a pair of elongate pad members 16 are preferably positionable upon the end portions and the floor 22 of the liner 20 that a vehicle 12 drives upon. The pad members 16 60 protect the liner 20 from damage when the vehicle 12 drives upon the present invention.

C. Buoyant Member

A buoyant member 50 is attached to an upper portion of the liner 20 as best illustrated in FIGS. 1 and 2 of the drawings. The buoyant member 50 is comprised of a structure that is buoyant with hazardous liquids positioned within the interior of the liner 20. The buoyant member 50 is preferably comprised of at least one piece of resilient foam, however various other types of buoyant materials and buoyant structures may be utilized to form the buoyant member 50. The buoyant member 50 is preferably comprised of a resilient buoyant foam material that is capable of lifting and elevating the upper portion of the liner 20 when a liquid is entered into the interior of the liner 20. The foam material is also preferably capable of being driven upon by heavy vehicles 12 without damage to the buoyant member 50. The buoyant member 50 preferably has a diameter of between 2 inches to 6 inches, but the diameter may be larger or smaller.

Figure 3:
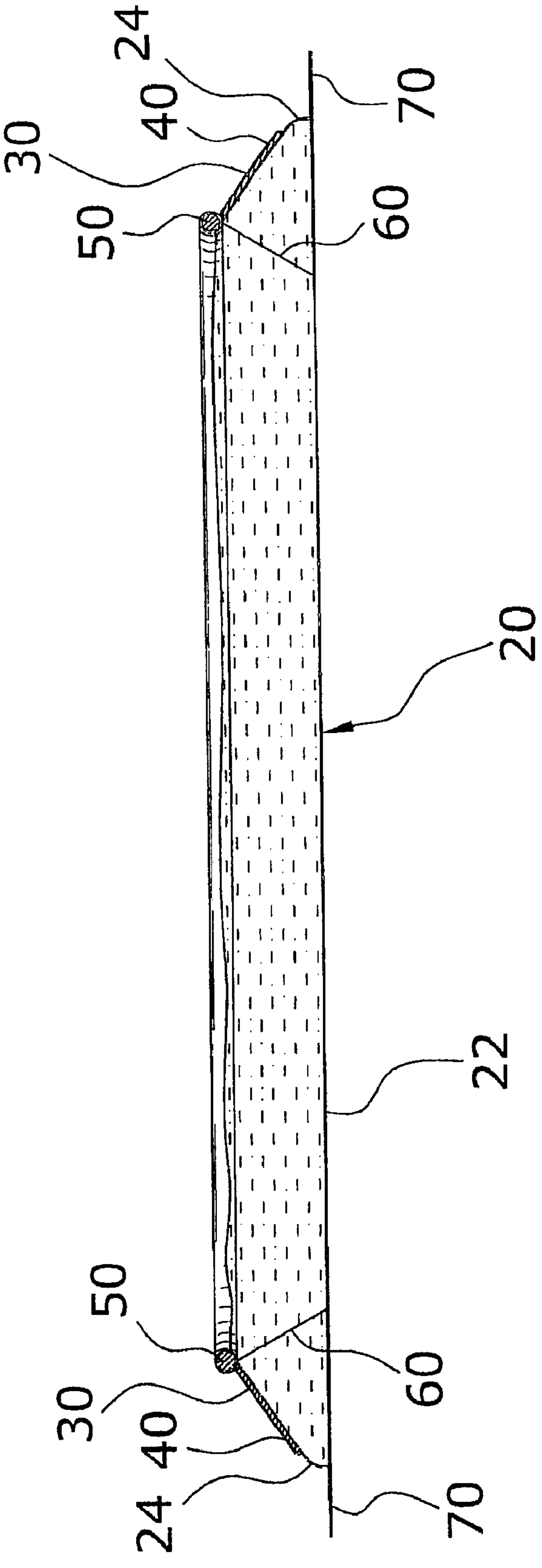
FIG. 3 is a cross sectional view taken along line 3-3 of FIG. 2.

The buoyant member 50 preferably extends around all or at least a substantial portion of an inner perimeter of the liner 20 (i.e. the upper opening of the liner 20). The buoyant member 50 may be attached to the liner 20 in various manners such as within a tubular formation of the upper end of the liner 20 as shown in FIG. 3 of the drawings.

D. Reinforcing Members

A plurality of reinforcing members 40 are preferably attached to or within the sidewall 24 to assist in maintaining the integrity and shape of the sidewall 24 when the liner 20 is filled with liquid. The reinforcing members 40 are comprised of a substantially rigid material such as but not limited to fiberglass, metal or wood.

As shown in FIGS. 1 and 2 of the drawings, the plurality of reinforcing members 40 are preferably substantially parallel to one another. A plurality of pockets 30 are preferably attached to the sidewall 24 as shown in FIGS. 1 and 2 of the drawings. The plurality of pockets 30 retain each of the plurality of reinforcing members 40 as further shown in FIGS. 1 and 2 of the drawings. The pockets 30 may be comprised of an open structure or a closed structure. As further shown in FIG. 1 of the drawings, the plurality of reinforcing members 40 are preferably positioned within a pair of opposing elongated portions of the liner 20 with the reinforcing members 40 substantially transverse with respect to an imaginary line X extending along a longitudinal axis of the liner 20.

E. Diffuser Members

A pair of diffuser members 60 are attached between the floor 22 and the sidewall 24 as illustrated in FIGS. 1 through 3 of the drawings. The pair of diffuser members 60 are preferably substantially parallel to one another and approximately equal in length. The diffuser members 60 are preferably shorter than the sidewall 24. The diffuser members 60 are preferably comprised of elongated structures that extend substantially parallel with respect to the imaginary line X as shown in FIG. 1 of the drawings. The diffuser members 60 further ensure that the sidewall 24 keeps an inwardly curved and/or angle ensuring maximum containment of liquid. The diffuser members 60 each preferably are comprised of an elongated rectangular structure when expanded as best shown in FIG. 2 of the drawings.

The pair of diffuser members 60 are preferably attached to the liner 20 adjacent to the buoyant member 50 as shown in FIG. 3 of the drawings. Attachment of the diffuser members 60 adjacent to the buoyant member 50 prevents the buoyant member 50 from extending outwardly when filled with a liquid.

The pair of diffuser members 60 are preferably comprised of a porous material which diffuses a substantial flow of liquid in the event of a catastrophic event. The pair of diffuser members 60 are preferably comprised of a mesh material or other material that includes a plurality of apertures to allow liquid to flow through.

The pair of diffuser members 60 are each attached to the floor 22 of the liner 20 inwardly away of the sidewall 24 as best illustrated in FIG. 3 of the drawings. The pair of diffuser members 60 each preferably retain a portion of the sidewall 24 at an acute angle with respect to the floor 22 of the liner 20 when filled with a liquid as further shown in FIG. 3 of the drawings.

F. Operation of Invention

Figure 5A:
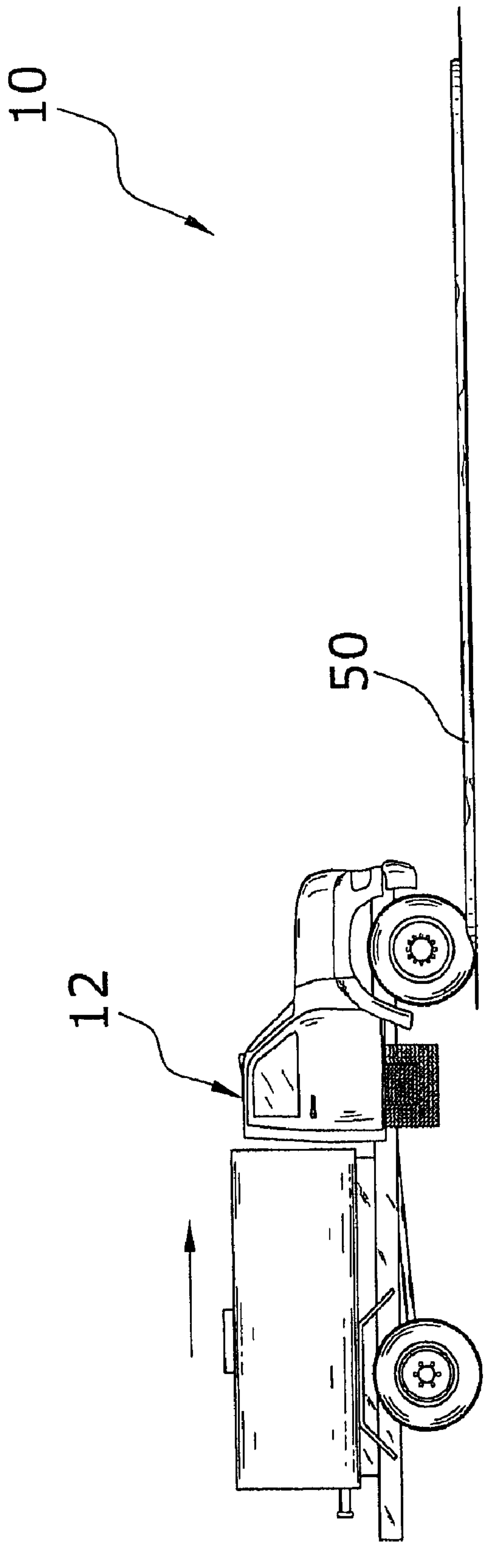
FIG. 5*a* is a side view of the present invention with a vehicle partially driven upon the same.
Figure 5B:
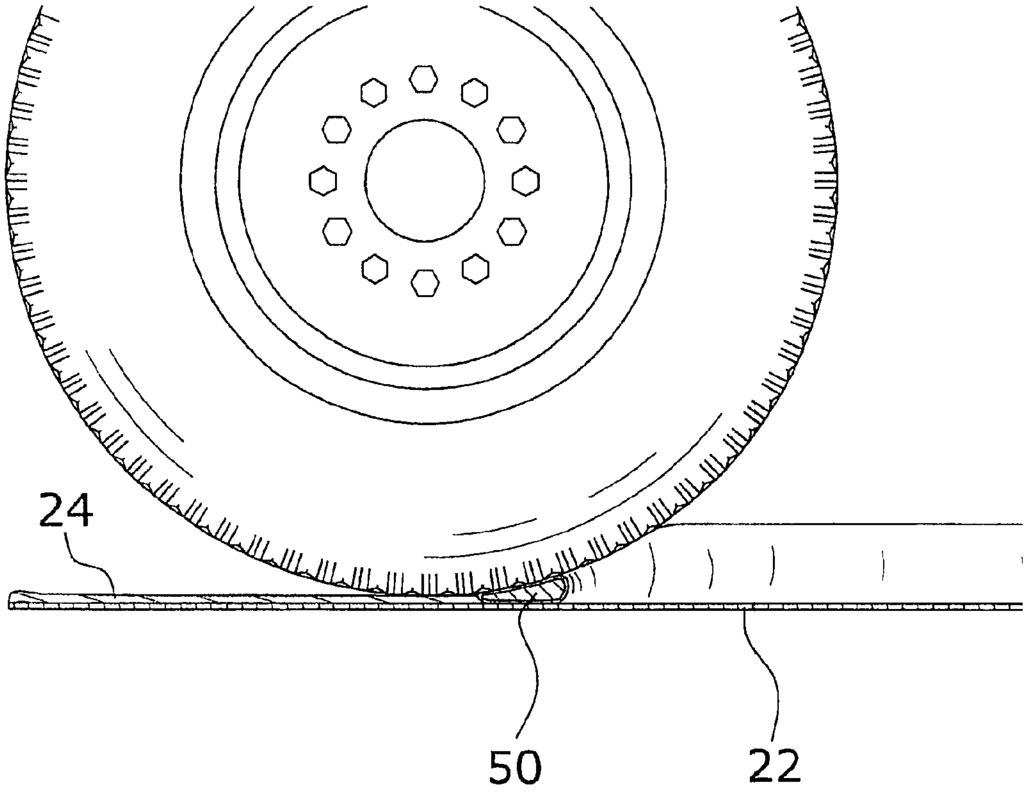
FIG. 5*b* is a magnified view of a wheel of the vehicle driving over the buoyant member.
Figure 5C:
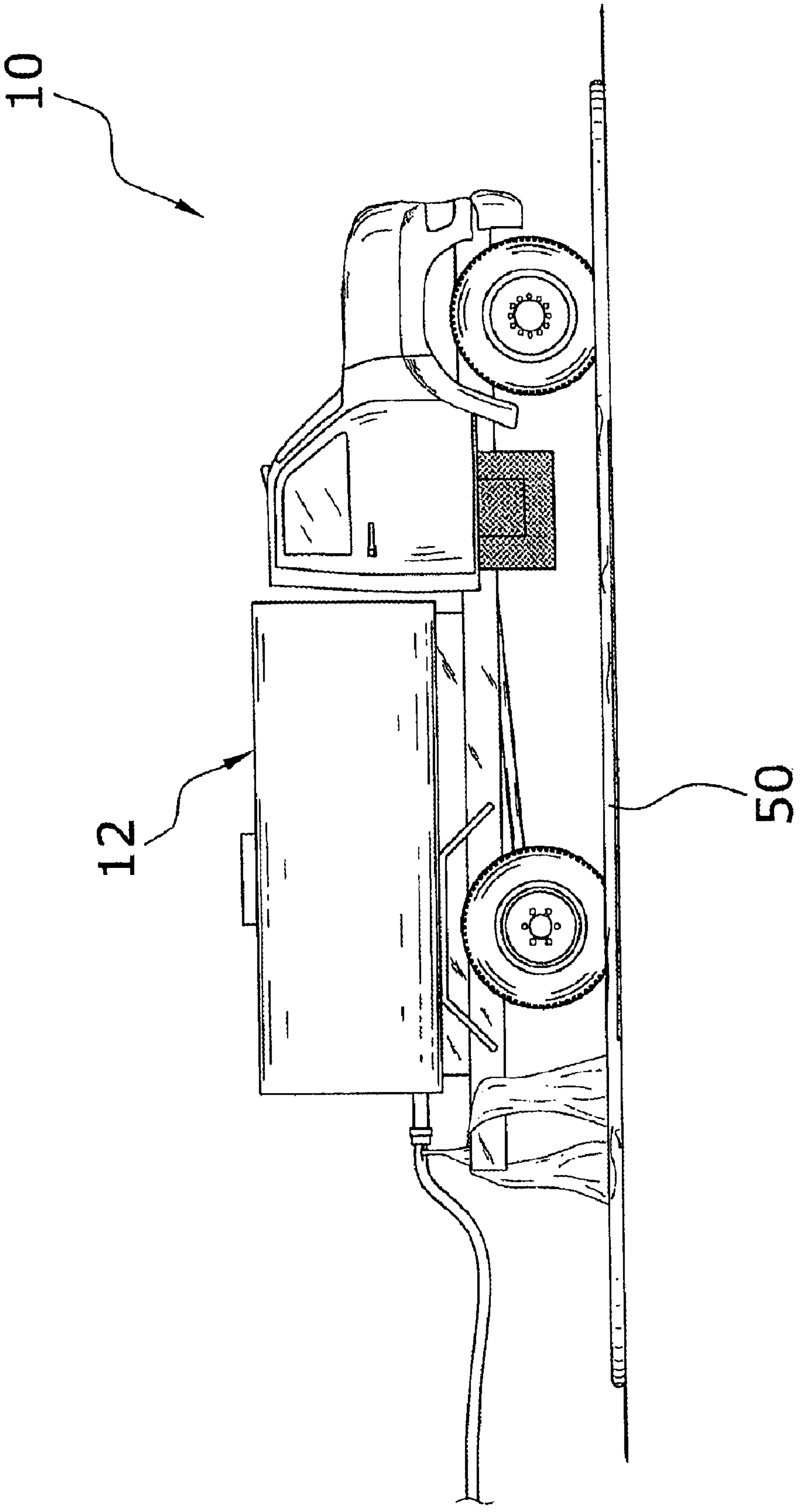
FIG. 5*c* is a side view of the present invention with the vehicle full driven upon the same with a hazardous liquid spill occurring.
Figure 5D:
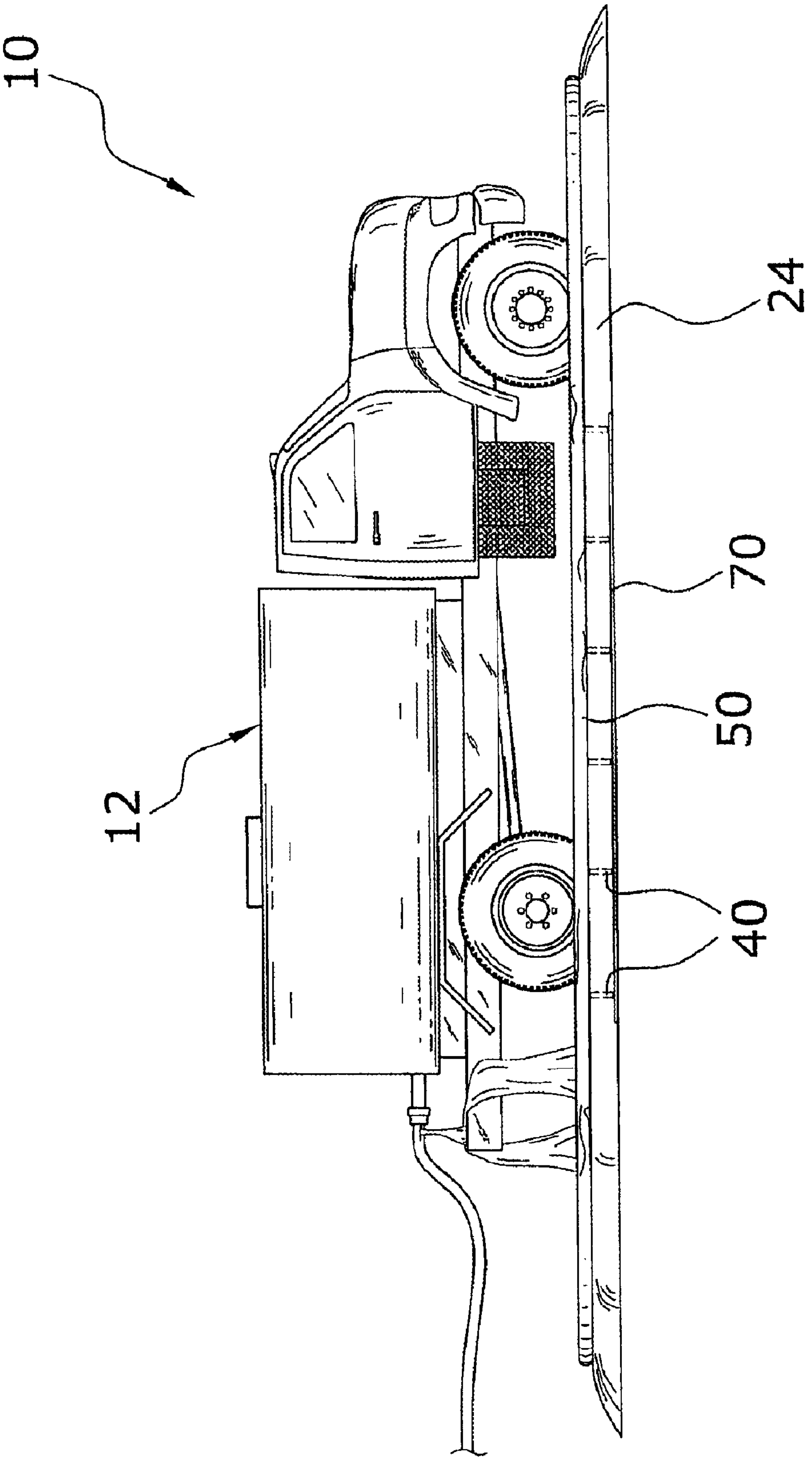
FIG. 5*d* is a side view of the present invention in a partially elevated state to contain the hazardous liquid spill.
Figure 5E:
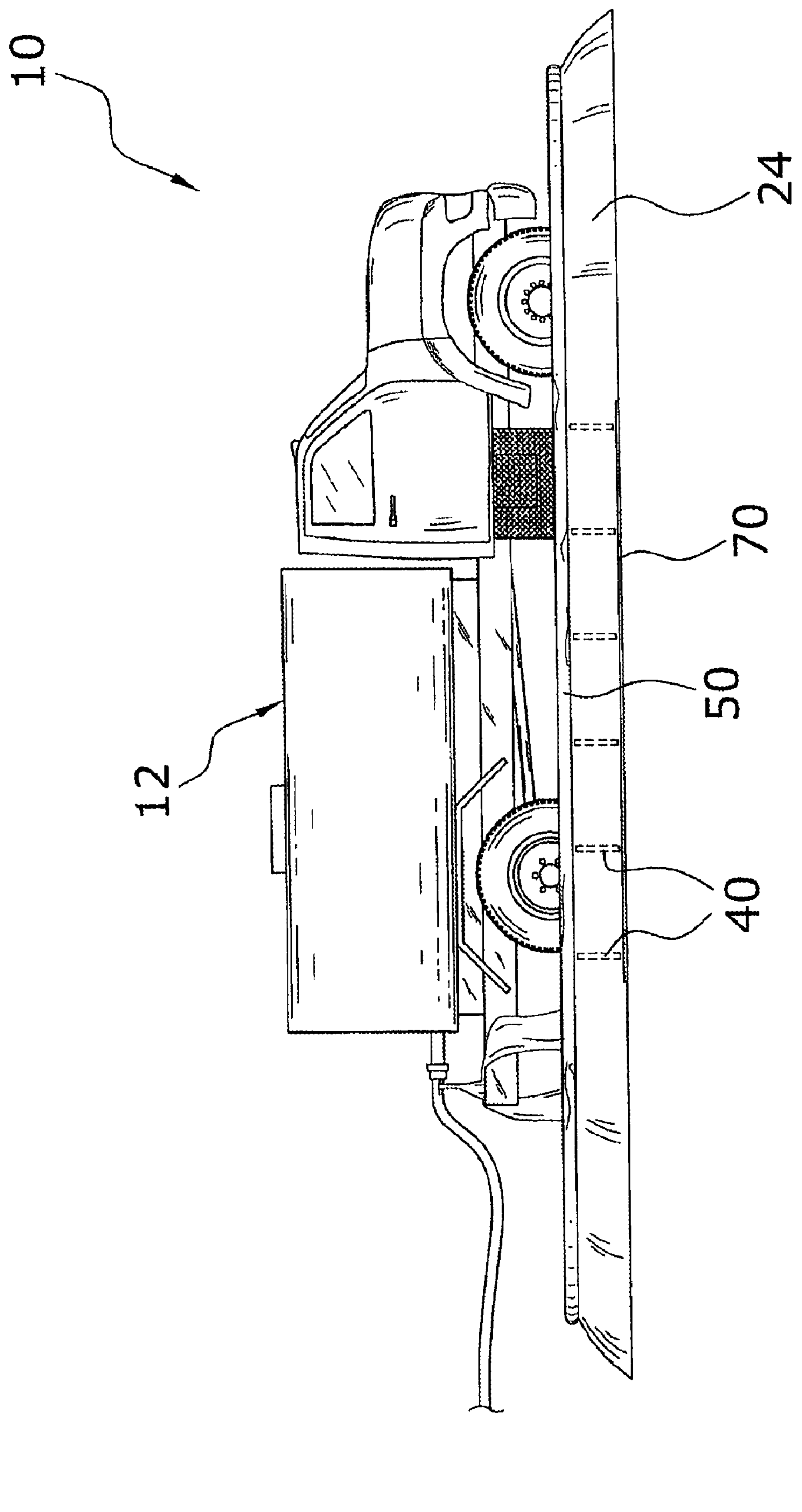
FIG. 5*e* is a side view of the present invention in the fully elevated state to contain the hazardous liquid spill.

In use, the user positions the liner 20 in the desired location where the loading/unloading of hazardous materials is to take place as shown in FIGS. 1 and 4 of the drawings. The user thereafter is able to drive a vehicle 12 onto the floor 22 of the liner 20 as illustrated in FIGS. 5*a* through 5*c* of the drawings. The user drives across one of the ends of the liner 20 preferably upon the pad members 16 as the liner 20 is substantially flat at the end portions. The driver may drive the vehicle 12 across various other locations upon the liner 20 since the entire liner 20 is flat when in the non-filled flat state. The user continues to drive the vehicle 12 on the present invention until fully positioned within the liner 20 as shown in FIG. 5*c* of the drawings. If a hazardous liquid is spilled into the liner 20, the hazardous liquid will first flood the floor 22 of the liner 20. The hazardous liquid will thereafter rise to a level adjacent to the sidewall 24 of the liner 20 and the buoyant member 50 wherein the liner 20 retains the liquid internally along with the buoyant member 50 rising slightly as shown in FIG. 5*d* of the drawings. As the liquid further fills the interior of the liner 20, the buoyant member 50 continues to rise to an elevated state which correspondingly elevates the liner 20 as shown in FIG. 5*e* of the drawings. The buoyancy of the buoyant member 50 is sufficient to elevate the liner 20 to ensure containment of the liquid within the interior of the liner 20 as shown in FIGS. 2, 3 and 5*e* of the drawings. The user is thereafter able to cleanup the site by first recovering the hazardous liquid from within the liner 20 and thereafter cleaning the liner 20 for reuse at a later time. For storage, the present invention is simply folded into a compact storage position as shown in FIGS. 6*a* and 6*b* of the drawings.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. A fluid controlled containment berm system, comprising:

a liner including a floor, a sidewall, an inner surface and an outer surface, said liner including two sides and two end portions, wherein said liner is comprised of an impermeable material;

a buoyant member attached to an upper portion of said liner; and a pair of porous diffuser members, each of whose length is greater than its width, a substantial portion of a first lengthwise edge of each porous diffuser member being attached to said floor, and a substantial portion of a second lengthwise edge of each porous diffuser member being attached to said sidewall at an inner surface of the liner, and said porous diffuser members are located only at said sides of said liner, wherein:

said porous diffuser members are configured and arranged to aid in controlling the orientation of corresponding portions of said sidewall with respect to said floor when said liner is full; and said porous diffuser members are configured to change from a collapsed state when said liner is empty, to a deployed state in response to a substantial filling of said liner.

2. The fluid controlled containment berm system of claim 1, wherein said pair of porous diffuser members are attached to said sidewall adjacent to said buoyant member.

3. The fluid controlled containment berm system of claim 1, wherein said porous diffuser members are comprised of a mesh material.

4. The fluid controlled containment berm system of claim 1, wherein said porous diffuser members each include a plurality of apertures.

5. The fluid controlled containment berm system of claim 1, wherein said pair of porous diffuser members are each attached to said floor of said liner inwardly away of said sidewall.

6. The fluid controlled containment berm system of claim 5, wherein said porous diffuser members retain the respective portions of said sidewall at an acute angle with respect to said floor of said liner when said liner contains a volume of fluid.

7. The fluid controlled containment berm system of claim 1, wherein said buoyant member extends around a substantial portion of an inner perimeter of said liner.

8. The fluid controlled containment berm system of claim 1, including a plurality of reinforcing members within said sidewall.

9. The fluid controlled containment berm system of claim 8, including a plurality of pockets attached to said sidewall, wherein one of said plurality of pockets retains one of said plurality of reinforcing members.

10. The fluid controlled containment berm system of claim 8, wherein said plurality of reinforcing members are positioned within a pair of opposing elongated portions of said liner.

11. The fluid controlled containment berm system of claim 1, wherein one of the porous diffuser members has a variable orientation that is responsive to a change in volume of a fluid contained in the liner.

12. The fluid controlled containment berm system of claim 1, wherein a geometry of the liner is variable such that a change in volume of a fluid contained in the liner corresponds with a change in the geometry of the liner.

13. The fluid controlled containment berm system of claim 1, wherein a substantial portion of one of the porous diffuser members is immersed in fluid when the liner is filled to capacity.

14. The fluid controlled containment berm system of claim 1, wherein the porous diffuser members are configured such that a collective length of the porous diffuser members is less than a total length of the sidewall.

15. The fluid controlled containment berm system of claim 1, wherein the liner has an elongate shape with rounded end portions.

16. The fluid controlled containment berm system of claim 1, wherein said diffuser members are configured and arranged such that fluid in said liner is able to pass through one or both of said diffuser members while remaining within said liner.

17. The fluid controlled containment berm system of claim 1, wherein a diffuser member is positioned at an acute angle with respect to said floor when said liner contains a volume of fluid.

18. The fluid controlled containment berm as recited in claim 1, wherein said liner is in a flat state when said liner is empty.

19. The fluid controlled containment berm as recited in claim 1, wherein said diffuser members are configured to collapse in response to a substantial emptying of said liner.

20. The fluid controlled containment berm as recited in claim 19, wherein an extent to which said diffuser members are collapsed corresponds to an extent to which said liner has been filled or emptied.

21. The fluid controlled containment berm as recited in claim 1, further comprising one or more side members attached to said liner and configured to enable securement of the fluid controlled containment berm to a surface.

22. A fluid controlled containment berm system, comprising:

a liner including a floor and a sidewall that is attached to said floor, said liner including two sides and two end portions;

a buoyant member attached to an upper portion of said liner; and a pair of diffuser members, each of whose length is greater than its width, a substantial portion of a first lengthwise edge of each diffuser member being attached to said floor, and a substantial portion of a second lengthwise edge of each diffuser member being attached to said sidewall at an inner surface of the liner, and said diffuser members are located only at said sides of said liner, wherein said diffuser members are configured to change from a collapsed state when said liner is empty, to a deployed state in response to a substantial filling of said liner.

23. The fluid controlled containment berm as recited in claim 22, wherein said diffuser members are configured such that a substantial emptying of said liner causes said diffuser members to collapse.

24. The fluid controlled containment berm as recited in claim 22, wherein said diffuser members are configured and arranged to aid in controlling an orientation of a corresponding portion of said sidewall with respect to said floor when said liner is full.

25. A fluid controlled containment berm system, comprising:

a liner including a floor and a sidewall that is attached to said floor, said liner having an elongate shape and including two sides and two rounded end portions;

a buoyant member attached to an upper portion of said liner; and a pair of diffuser members, each of whose length is greater than its width, a substantial portion of a first lengthwise edge of each diffuser member being attached to said floor, and a substantial portion of a second lengthwise edge of each diffuser member being attached to said sidewall at an inner surface of the liner, and said diffuser members are located only at said sides of said liner, wherein said fluid controlled containment berm system is self-deploying such that:

said liner is configured to change from a flat state when said liner is empty, to an elevated state in response to a substantial filling of said liner; and said diffuser members are configured to change from a collapsed state when said liner is empty, to a deployed state in response to a substantial filling of said liner.

26. The fluid controlled containment berm system of claim 25, wherein said diffuser members are configured to change from said deployed state to said collapsed state in response to a substantial emptying of said liner.

27. The fluid controlled containment berm system of claim 25, wherein said liner is configured to change from said elevated state to said flat state in response to a substantial emptying of said liner.

28. The fluid controlled containment berm as recited in claim 25, wherein said diffuser members are configured and arranged to aid in controlling the orientation of a corresponding portion of said sidewall with respect to said floor when said liner is full.

29. The fluid controlled containment berm as recited in claim 22, further comprising a pair of elongate pad members configured to be positioned on the end portions and floor of the liner.

30. The fluid controlled containment berm as recited in claim 22, wherein each diffuser member is substantially the same length as a side of the liner.

* * * * *